United States Patent
Chen et al.

(10) Patent No.: US 8,881,037 B2
(45) Date of Patent: Nov. 4, 2014

(54) SYSTEMS AND METHODS FOR MANAGING TRANSFORM POINTS AND EFFECTS IN MULTI-STATE ELECTRONIC CONTENT

(75) Inventors: Winsha Chen, Redwood City, CA (US); Adam E. Altman, Woodinville, WA (US)

(73) Assignee: Adobe Systems Incorporated, San Jose, CA (US)

( * ) Notice: Subject to any disclaimer, the term of this patent is extended or adjusted under 35 U.S.C. 154(b) by 405 days.

(21) Appl. No.: 12/959,738

(22) Filed: Dec. 3, 2010

(65) Prior Publication Data
US 2014/0289653 A1    Sep. 25, 2014

(51) Int. Cl.
*G06F 3/048* (2013.01)

(52) U.S. Cl.
USPC .......................................................... 715/763

(58) Field of Classification Search
USPC .......................................................... 715/763
See application file for complete search history.

(56) References Cited

U.S. PATENT DOCUMENTS

| | | | |
|---|---|---|---|
| 6,621,504 B1 * | 9/2003 | Nadas et al. | 715/723 |
| 2004/0234098 A1 * | 11/2004 | Reed | 382/100 |
| 2008/0317387 A1 * | 12/2008 | Berger et al. | 382/309 |

OTHER PUBLICATIONS

"Getting Started with Flash Catalyst Tutorial" by Ryan Stewart (hereinafter Stewart), published on Jan. 7, 2009 at http://blog.digitalbackcountry.com/2009/01/getting-started-with-flash-catalyst-tutorial/.*

* cited by examiner

*Primary Examiner* — Peiyong Weng
(74) *Attorney, Agent, or Firm* — Kilpatrick Townsend & Stockton LLP

(57) ABSTRACT

One exemplary embodiment involves receiving input editing electronic content being edited in the electronic content creation application and identifying changes to the electronic content being edited that are required based on the input. The exemplary embodiment further involves determining one or more of the changes to be hidden effects and selectively displaying information associated with one or more effects defined for the electronic content being edited, where the information associated with the one or more effects excludes information about the hidden effects.

20 Claims, 6 Drawing Sheets

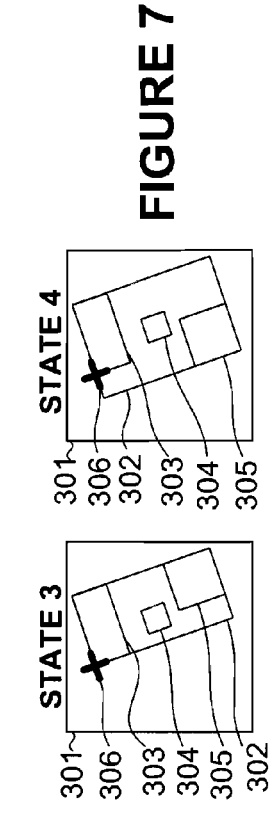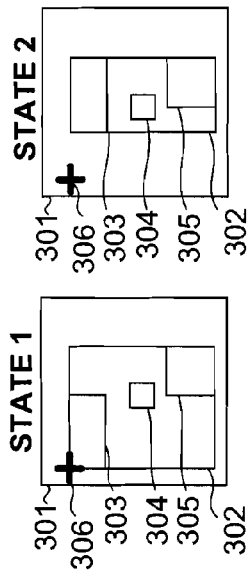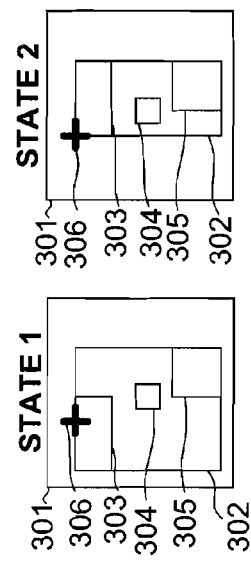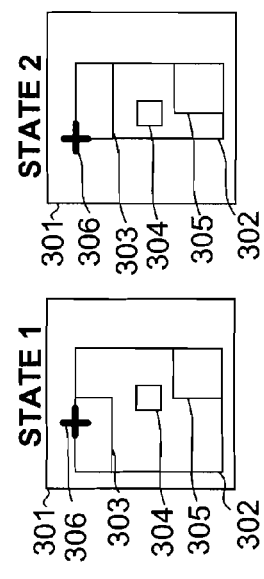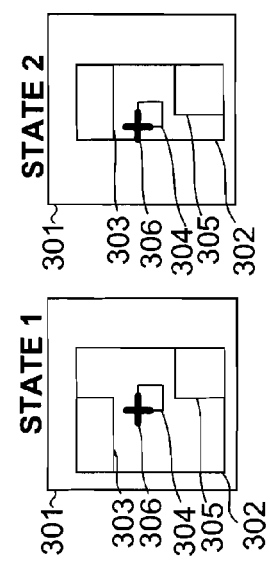

SYSTEMS AND METHODS FOR MANAGING TRANSFORM POINTS AND EFFECTS IN MULTI-STATE ELECTRONIC CONTENT

FIELD

This disclosure relates generally to computer software that creates, edits, runs, displays, provides, shares, or otherwise uses electronic content.

BACKGROUND

Various computer applications are used to create graphics, applications, animations, videos, and other electronic content. Many applications provide a what-you-see-is-what-you-get (WYSIWYG) interface that allows the appearance of the content being created to be specified on a graphical canvas area. However created, electronic content can involve displaying, animating, or otherwise playing various types of visually-perceptible objects. Geometric shapes, images, pictures, and text are examples of such objects. How such objects are positioned and used in the electronic content can vary and may depend upon the particular type of electronic content.

On web pages, rich Internet applications, and various other types of electronic content, the position of objects is often defined in a creation application with reference to an aspect of the electronic content. For example, an object's position may be defined with respect to distance from one or more of the edges of the electronic content's display area. While defining positioning with respect to content edges is useful, it is also often desirable to create and use more complicated object layouts. Content creators, e.g., designers, developers, and other persons, for example, often find it useful to define object positioning with respect to a reference point common to objects in the group. For example, all of the individual objects that make up a button may be defined as parts of a single group. The position of each object can be defined relative to a common origin, such as an upper left most point of a common group bounds. Thus, in a content creation environment, the content creator can move the entire group, e.g., all parts of a button, simply by making an edit that repositions the origin. In one example, a button component is implemented as a parent component and the individual objects that make up the button are defined as child components such that their position is defined relative to an origin or bounds associated with the parent button component.

An "effect" is a change from one state to another in multi-state content. Content creators can define or otherwise create an effect in various ways in various content creation environments. In some environments, an effect is defined based on a reference to a transform point. The term "transform point" is used to refer to any reference point used for determining one or more changes across two or more states in multi-state content. A transform point can provide a useful reference for effects in which one or more objects is moved, rotated, resized, or otherwise edited where such editing is defined relative to that common point. For example, a group of two objects may have a first orientation in a first state and may be rotated about a particular transform point to have a second orientation in a second state. Rotation of both of the objects in the group is based on that single transform point such that the group of objects is rotated about that point as whole. A content creation application may display information about these rotations, for example, by listing a rotation effect in a chart or other listing of effects applied to the objects or the associated group. Such information allows a content creator to easily understand and edit the individual effects specified to occur between different states of the multi-state content that is being created.

Existing content creation applications, such as Flash® Catalyst® 1.0 available from Adobe Systems Incorporated of San Jose, Calif., provide various features that identify, for content creators, the effects that are defined between states of content being created. However, content creators are often also presented with additional (helper) effects that the content creators do not expect to see. Various user edits can affect the position of the origin and thus require definitional adjustments that are not descriptive of the intended change between state but that are instead descriptive of an adjustment required. As an example, moving an object that is a member of a group may result in the generation of move effects for other objects that are also members of the same group even though such other objects were not moved. In this example, such helper effects may be generated because moving the object might require normalizing the group. The terms normalizing and normalization refer to changing a position of an origin and updating objects that reference the origin to account for that change. In the present example, offsetting the origin requires adjustments to the x/y values defining the positioning of the other objects so that those objects will maintain their same global positions. Displaying these helper effects, for example, in an effects list, may be confusing to a content creator. Moreover, allowing a content creator to modify these helper effects can result in unexpected behavior.

SUMMARY

One exemplary embodiment involves receiving input editing electronic content being edited in an electronic content creation application and identifying changes to the electronic content being edited that are required based on the input. The exemplary embodiment further involves determining one or more of the changes to be hidden effects and selectively displaying information associated with one or more effects defined for the electronic content being edited, where the information associated with the one or more effects excludes information about the hidden effects. This illustrative embodiment is mentioned not to limit or define the disclosure, but to provide an example to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where:

FIG. 3 illustrates an exemplary movement of an object in a new state of multi-state electronic content being created on a user interface displayed in an exemplary computing environment;

FIG. 5 illustrates an exemplary movement of a transform point in a new state created in the electronic content of FIG. 3;

FIG. 7 illustrates an example of a change after rotation of objects relative to a transform point in a new state created for the electronic content of FIG. 5;

FIG. 9 illustrates an exemplary movement of a transform point associated with a rotated object in the electronic content of FIG. 7.

DETAILED DESCRIPTION

Figure 1:
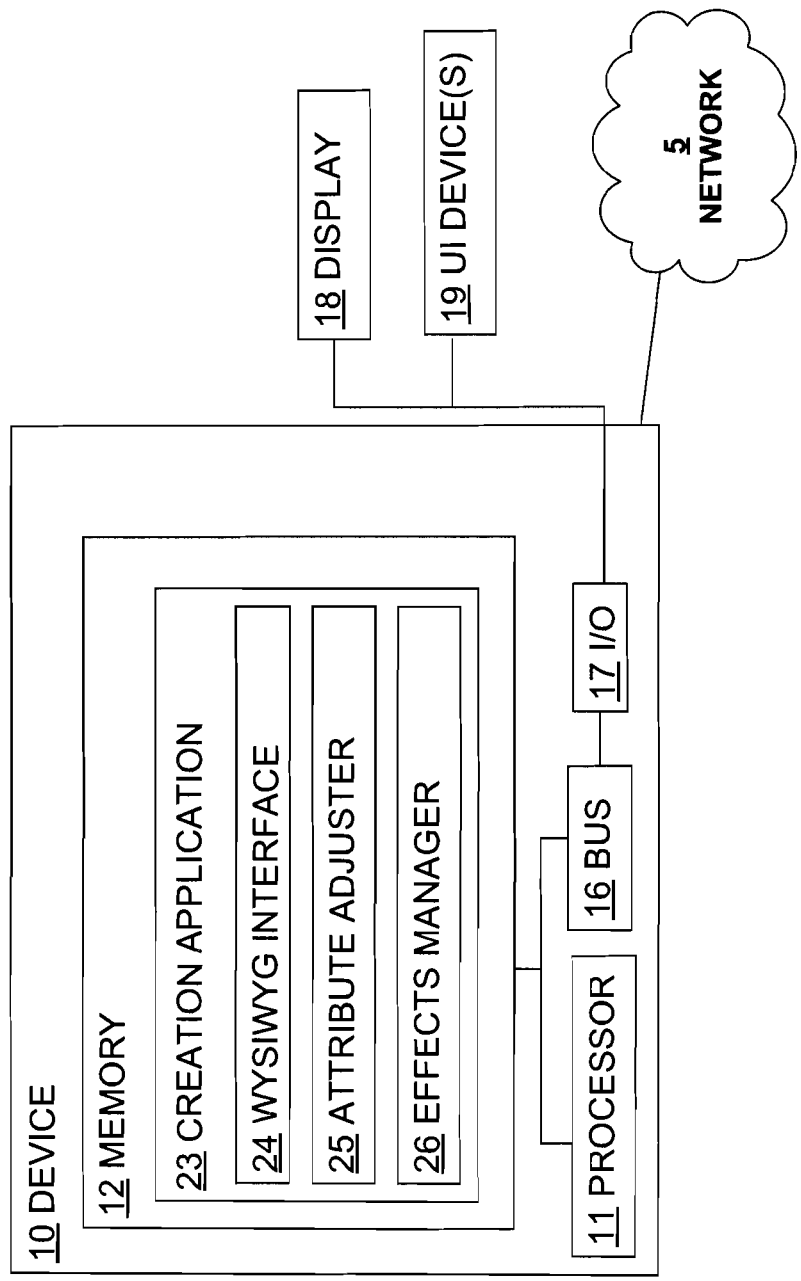
FIG. 1 depicts an exemplary computing environment for creating electronic content.

Methods and systems are disclosed for creating multi-state electronic content, for example, using features provided by a content creation application. An exemplary content creation application may provide a user interface that receives input specifying the position and behaviors of objects used in multi-state content that is being created. Positions and transformations of objects may be defined using sophisticated relationships to provide flexibility and other advantages. For example, the individual positions of an object or group of objects may be defined relative to a parent object, e.g., where an origin of a parent object defines a bounds for the group so that repositioning the parent results in repositions all of the children accordingly. A content creation application may also allow a creator to apply a transformation, such as a rotation, to an object or group of objects. A transformation may be specified relative to a transform point. For example, a rotation of a group of objects may be specified with respect to a transform point. An exemplary content creation application can manage the sophisticated relationships required to allow use of object groupings, transformations, effects, as well as other features, in the development of multi-state electronic content.

An exemplary content creation application may receive input that defines a change of an object between a first state and a second state where the change is specified relative to an origin. The exemplary content creation application may provide various features that allow a user to see and edit this effect. For example, it may display, simultaneously or separately, the object in each of the two different states so that a content creator can observe the change and envision the specified effect. The exemplary content creation application may also provide a listing of effects with listings that provide information about the various effects that are defined in the electronic content, e.g., identifying that an object is moved according to a first effect, that a second object is rotated according to a second effect, etc.

An exemplary content creation application can provide various features that are particularly useful in managing transform points and effects in multi-state electronic content being created. For example, a content creation application can allow the use of a transform point available to provide a stable point for specifying changes across states and provide limited information of hide information about other changes that are required to internally manage those expressly specified changes. Thus, only those changes or effects that map to explicit content creator actions may be made visible in the interface. Helper effects, to the extent any are created and used by underlying code, can be hidden effects. The terms "hidden effect" and "hidden effects" refer to any change or changes that affect(s) the content but for which something, such as information about the change(s), is hidden or otherwise not displayed in the same manner as for non-hidden effects. The content creation environment may, as an example, list or otherwise display information about effects that the content creator has expressly intended, while hiding information about non-intuitive, helper effects.

FIG. 1 depicts an exemplary computing environment for creating electronic content. The methods and systems disclosed herein are also applicable on other computing systems and environments. The environment shown in FIG. 1 comprises a wired or wireless network 5 to which device 10 is connected. In one embodiment, the network 5 comprises the Internet. In other embodiments, other networks, intranets, or combinations of networks may be used. Other embodiments do not involve a network and may, for example, provide features on a single device or on devices that are directly connected to one another. Other alternative networks, computers, and electronic device configurations are also possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. The exemplary device 10 is used as a special purpose computing device to provide specific functionality offered by its applications. As an example, device 10 is shown with a display 18 and various user interface devices 19. A bus, such as bus 16, will typically be included in a device.

As used herein, the phrase "electronic content" refers to any text, graphics, video, audio, application, executable code, or other material that can be stored on and/or presented on or through a computer or other device. A piece of electronic content can be provided as one or more electronic files and developed as part of a single content creation project. An electronic content creation application may open such electronic content for editing, for example, such that edits made using the electronic content creation application result in changes to the one or more electronic files that define or otherwise make up the piece of electronic content being created.

As used herein, the term "object" refers to any component, representation, graphic, element, or anything else that is or can be displayed as a part of electronic content. An object may comprise features and attributes that define, specify, influence, or affect how the item appears, behaviors, or is otherwise used in electronic content. An object may have features and attributes that include one or more other objects within the item or that otherwise associate the object with one or more other objects, for example, though a parent/child relationship.

As used herein, the term "multi-state content" refers to content in which the content itself and/or one or more objects of the content are associated with more than one state. Each state specifies a particular configuration, relationship, and/or selection of properties for objects associated with that state. A given object may be associated with one or more states in multi-state content. In some, but not all, electronic content, the state of electronic content and/or particular objects within electronic content changes based on user input, events, and/or timeline position. As a specific example, a button object might be associated with an "up" state and a "down" state, where the up state describes the appearance of the button for the runtime circumstance in which the button is waiting for user interaction and the down state describes the appearance of the button for the runtime circumstance in which a user positions a mouse cursor over the button and clicks the mouse button.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the device 10 comprises a computer-readable medium as memory 12 coupled to a processor 11 that executes computer-executable program instructions and/or accesses stored information. Such a processor 11 may comprise a microprocessor, an ASIC, a state machine, or other processor type, and can be any of a number of computer processors. Such a processor comprises, or may be in communication with, a computer-readable medium which stores instructions that, when executed by the processor, causes the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, flash memory, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, device 10 comprises a creation application 23 that is used by content creators to create electronic content. The creation application 23 provides a what-you-see-is-what-you-get (WYSIWYG) interface 24, an attribute adjuster 25, and an effects manager 26. Each of the WYSIWYG interface 24, attribute adjuster 25, and effects manager 26 may be implemented as individual modules that provide specific functionality of the creation application 23. For example, the exemplary WYSIWYG interface 24 may be configured to receive input for an object of electronic content being edited. Such input may, for example, modify a position or size of the object in at least one state of the multiple states. The attribute adjuster 25 may be configured to adjust object attributes based on the input to the WYSIWYG module. In one particular example, the WYSIWYG interface 14 receives input and, in response, the attribute adjuster 15 creates an effect for an object and the effects manager 26 causes information about the effect to be displayed. The creation application 23 may be used to export, publish, or otherwise create one or more files comprising computer-readable medium that defines the electronic content for display on other computer devices.

Figure 2:
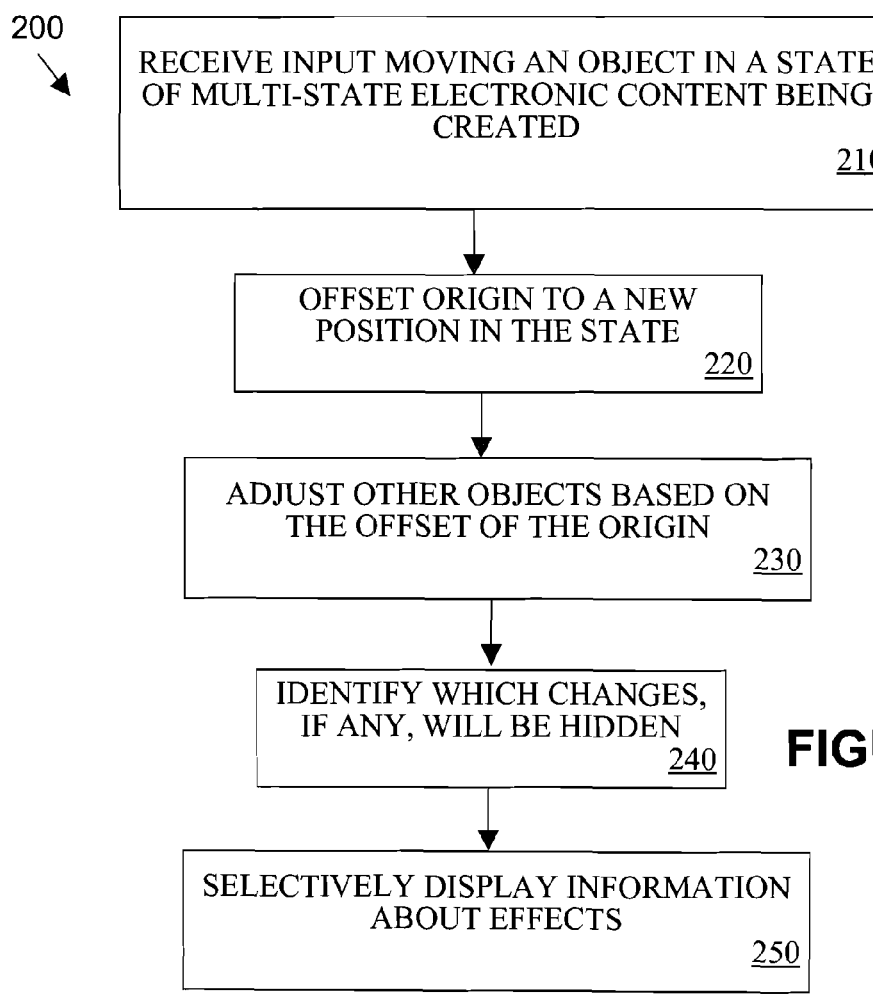
FIG. 2 is a flow chart illustrating an exemplary computer-implemented method of selectively displaying information about effects when movement of an object results in offsetting of an origin in a state of multi-state electronic content.

FIG. 2 is a flow chart illustrating an exemplary computer-implemented method 200 of selectively displaying information about effects when movement of an object results in offsetting of an origin in a state of multi-state electronic content. The method 200 is illustrated in the context of an exemplary content creation application in which objects of a group are positioned relative to a common origin. The position of that common origin may change, for example, when the content creation application normalizes the group in response to a content creator edit and may differ from state to state.

The exemplary method 200 involves receiving input moving an object in a state of multi-state electronic content being created, as shown in block 210. For example, this may involve receiving, in an electronic content creation application provided on a computer device such as the creation application 23 of device 10, input for an object of electronic content being edited. Exemplary input may move, resize, rotate, reshape, and/or otherwise change an attribute of the object and/or may move a transform point from one location to another, among other things.

FIG. 3 illustrates an exemplary movement of an object in a state of multi-state electronic content being created. In "STATE 1" of FIG. 3, an editing interface 301 of a content creation application displays a first state in which objects 303, 304, 305 are positioned. The objects 303, 304, 305 are associated with one another as part of a group having bounds 302. In "STATE 2" of FIG. 3, a content creator has created a second state and moved object 303 to a new position relative to its position in "STATE 1" shown in FIG. 3.

After receiving the input moving the object, the method 200 of FIG. 2 offsets the origin to a new position in the state, as shown in block 220. For example, a content creation application may offset the origin to a new position when a content creator moves an object, such as object 303 of FIG. 3, that defines the top/left extent of a group of objects 303, 304, 305. After such an edit, the content creation application may identify a new top/left most point or other new position based on the location of the objects 303, 304, 305 after the move. In FIG. 3, the movement of object 303 in "STATE 2" results in a resizing of the bounds 302, which results in normalization of the group in which the origin is offset to a position at the top/left extent of bounds 302. The transform point 306 is positioned relative to the origin of the group and thus, when the origin is offset due to normalization, the transform point 306, is offset by the same amount in the opposite direction to maintain its same global position.

The method 200 of FIG. 2 next adjusts other objects based on the offset made to the origin, as shown in block 230. Such adjustments can be made so that those objects do not appear to move, e.g., the objects are not moved relative to the outermost bounds of the entire electronic content being created or the entire area of the editing interface 301 of FIG. 3. While the content creator does not perceive movement of such objects, the x/y values that define the position of those objects can be adjusted to account for the changed origin position. For example, in FIG. 3, the position of objects 303, 304, 305 may be defined relative to the origin which has been offset in "STATE 2." Corresponding changes to negate the offsetting of the origin can be applied. As a specific example, in "STATE 1" of FIG. 3, object 304 may have an "x" value that specifies its position at 100 pixels to the right of the origin. The movement of object 303 may result in the origin being offset by 80 pixels in "STATE 2." The content creation application may maintain the position of object 304 by adjusting its "x" value to specify its position at 20 pixels to the right of the origin in "STATE 2."

The method 200 of FIG. 2 next identifies which changes, if any, will be hidden, as shown in block 240, and selectively displays information about effects, as shown in block 250. Changes that are merely offsetting or that otherwise maintain the position of an object to account for an offset due to normalization may be hidden. In contrast, changes that are expressly created and intended as effects by a content creator may not be hidden. A content creation application may, for example, identify and display information (not shown) for the movement effect that has been defined for the movement of the object 303 between "STATE 1" and "STATE 2" of FIG. 3.

Such information can be presented to the content creator so that the content creator can easily understand effects that have been defined in the electronic content that is being created. In contrast, information about the offsetting of the origin or the adjustments made to other objects based on the offsetting of the origin may be hidden and thus not displayed as effects.

By presenting only effects that a content creator expects to see, a content creation application can provide a useful and easy to understand interface for creating and editing effects specified in multi-state electronic content being created. An exemplary content creation application can track various offsetting changes for internal management purposes while exposing various content-creator-specified changes for display and editing. Selectively presenting effects in this way may provide useful information and facilitate user interaction with respect to such effects specified in the content creation application.

For example, one embodiment presents an interactive list of effects that includes only effects that the content creator expects to see, such as, for example, a movement of an object from one position to another as specified by the content creator. The content creation application may hide non-intuitive internally-tracked changes that are applied to account for offsetting changes and other effects that are associated with offsetting changes that the content creator does not expect to see as effects. Such an exemplary system provides various benefits.

Generally, in a content creation application, a content creator may make various edits that result in a change to a transform point. Changing a transform point may require that the system makes offsetting changes so that the change to the transform point does not unexpectedly reposition the actual objects that reference the transform point. For example, a content creator may edit the transform point of a rotated object and the system may keep the position of the rotated object stable even though the transform point used in defining the rotation has been moved. One embodiment defines and manages a transform point for an object or group of objects across multiple states of electronic content being created. Such management may involve hiding non-intuitive effects and allowing the content creator to edit a transform point, for example, even after a transform point is used to define a rotation of one or more objects.

An exemplary content creation application can manage a transform point across states when the content creator makes edits in various ways. For example, if a content creator moves the transform point in one state, the content creation application will offset the transform point by the same amount in all the other states. The offset can be calculated relative to each object's coordinate space, for example, relative to the origin with respect to which a particular object's position is defined. If a group is normalized, the content creation application can offset the transform point by the same amount in the opposite direction. If the content creator moves a transform point of a rotated object, the content creation application can update the x/y values of any affected objects to keep those objects from moving on screen. An effects manager of a content creation application can use a transform point to determine what objects were explicitly changed by the content creator across the different states and hide all the other helper effects that are generated to support content creator edits across the multiple states.

Figure 4:
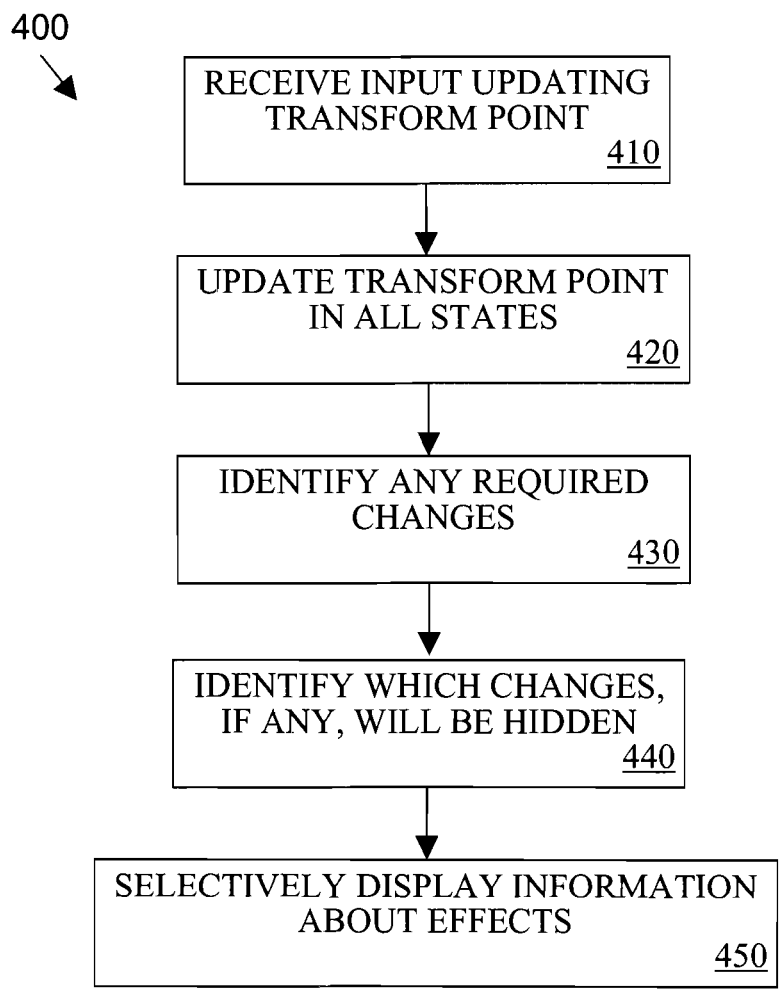
FIG. 4 is a flow chart illustrating an exemplary computer-implemented method of selectively displaying information about effects when a transform point is updated.

FIG. 4 is a flow chart illustrating an exemplary computer-implemented method 400 of selectively displaying information about effects when movement of a transform point changes to other objects that should be hidden. The exemplary method involves receiving input updating a transform point, as shown in block 410. For example, this may involve receiving, in an electronic content creation application provided on a computer device such as the creation application 23 of device 10, input for an object of electronic content being edited. Exemplary input may move or otherwise adjust a transform point. For example, a content creator may have selected the transform point in a particular state and moved it to another location.

FIG. 5 illustrates an exemplary movement of a transform point in a new state created for the electronic content of FIG. 3. In FIG. 5, a content creator has added a new state, "STATE 3." In that new state, the content creator has moved the transform point 306 and then rotated the group associated with bounds 302, thus rotating each of objects 303, 304, 305 relative to the transform point 306.

In the method 400 of FIG. 4, after receiving the input updating the transform point, the method 400 updates the transform point in all states, as shown in block 420, and identifies any required changes, as shown in block 430. For example, if a transform point is moved to a new location in a second state, since positions of objects in the first state may be defined by reference to the transform point location, references defining the position of those objects may need to be changed. For example, in FIG. 5, upon receiving the input moving the transform point 306 in the new state, the content creation application determines that the transform point 306 has been updated and updates the position of the transform point 306 in the other states, i.e., "STATE 1" and "STATE 2." The content creation application then determines any additional changes that are required based on the changed position of the transform point 306. For example, the system may determine that references made to the transform point 306 in the other states now need to account for the changed position of the transform point 306. Thus, object positioning information, defining the positioning of objects 303, 304, 305 in those other states may be updated.

In FIG. 4, the method 400 next identifies which changes, if any, will be hidden as shown in block 440, and selectively displays information about effects, as shown in block 450. Since moving the transform point in one state, offsets the transform point by the same amount in the other states, the relative positions of objects are preserved with one or more changes. Such changes may be hidden since the changes are merely ensuring that the change to a transform point does not unintentionally affect another state. As a specific example, a transform point may be moved and one or more changes may be made so that the relative position of an object or group of objects with respect to the transform point is maintained. This type of change offsets the change that would otherwise have been caused by the input moving the transform point. The method 400 may determine to hide such a change since it is implemented for the purpose of offsetting. This type of change may be distinguished from other changes or other effects that better reflect actual changes or effects specified by a content creator.

The content creation application does not display changes or effects that are identified as hidden, such as an offsetting change that merely accounts for a change in position of a transform point. The effects that are displayed may thus better represent the effects that the user has defined. Also, the displayed effects may be editable. Offsetting changes and other effects that are hidden may not be editable by a content creator. These changes can be identified as offsetting changes that will be hidden from the user. Even though offsetting changes based on the new transform point 306 location may be similar to other changes and effects, the content creation application determines that those changes will be hidden.

Accordingly, the content creation application continues to display the information about the movement effect that was defined for the movement of the object 303 between "STATE 1" and "STATE 2" and additionally identifies and displays information about the rotation effect that was defined by the rotation of the group of objects defined by bounds 302 in "STATE 3." However, the other changes identified for purposes of maintaining positioning are hidden and thus not displayed as effects.

Figure 6:
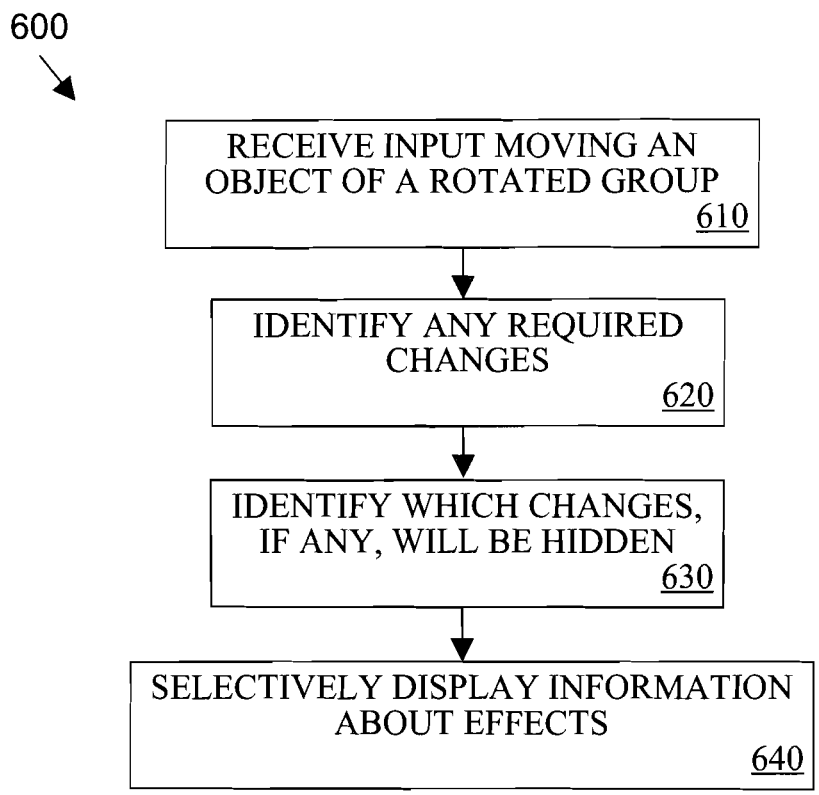
FIG. 6 is a flow chart illustrating an exemplary computer-implemented method of managing changes after rotation of an object relative to a transform point.

FIG. 6 is a flow chart illustrating an exemplary computer-implemented method 600 of managing changes after rotation of an object relative to a transform point. The exemplary method involves receiving input moving an object of a rotated group, as shown in block 610. For example, this may involve receiving, in an electronic content creation application provided on a computer device such as the creation application 23 of device 10, input for an object of electronic content being edited. FIG. 7 illustrates an example of a change received after rotation of objects relative to a transform point in a new state created for the electronic content of FIG. 5. In FIG. 7, the content creator has added a new state, "STATE 4." In that new state, the content creator has moved object 305 within the rotated group of object 303, 304, 305.

In the method 600 of FIG. 6, after receiving the input moving the rotated object, the method 600 identifies any required changes, as shown in block 620. In FIG. 7, the movement of object 305 results in normalization and in resizing of the bounds 302. To maintain the transform point's position with respect to the normalization, the content creation application offsets the transform point and updates the (x,y) positions of the objects 303, 304 to reflect that offsetting.

In FIG. 6, the method 600 next identifies which changes, if any, will be hidden as shown in block 630, and selectively displays information about effects, as shown in block 640. With respect to the example of FIG. 7, the content creation application continues to display the information about the movement effect that was defined for the movement of the object 303 between "STATE 1" and "STATE 2," the information about the rotation effect that was defined by the rotation of the group of objects in "STATE 3," and additionally displays information for the movement effect that was defined for the movement of object 305 in "STATE 4." However, other changes identified for purposes of maintaining positioning are hidden and thus not displayed as effects.

Figure 8:
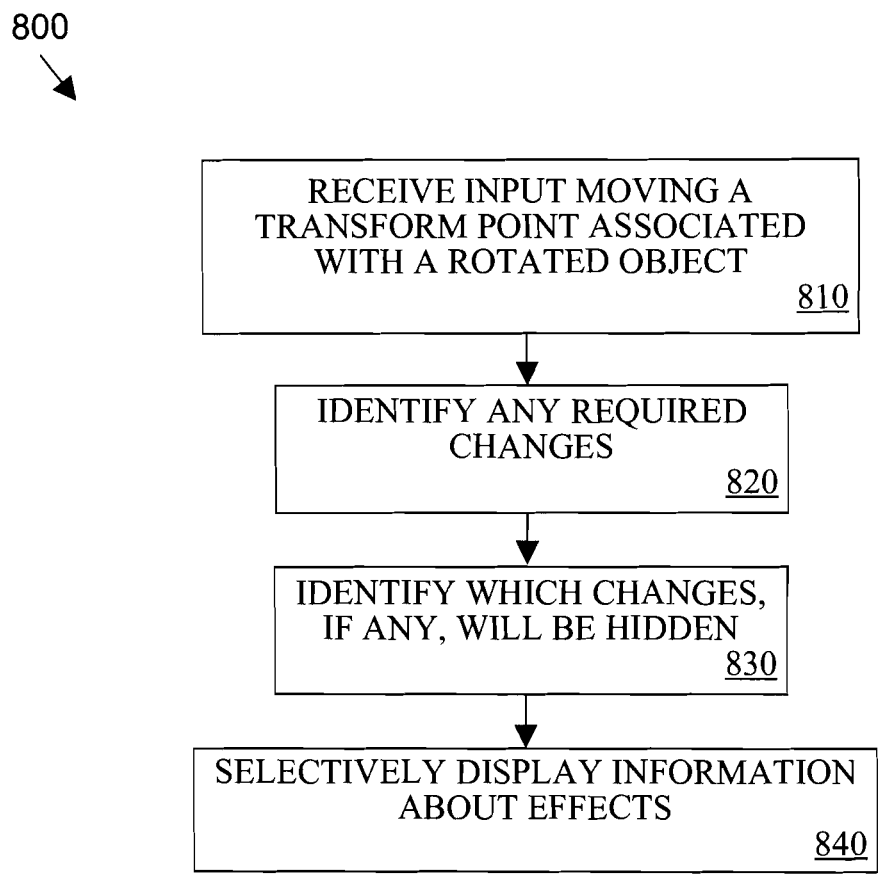
FIG. 8 is a flow chart illustrating an exemplary computer-implemented method of managing changes after moving a transform point associated with a rotated object.

FIG. 8 is a flow chart illustrating an exemplary computer-implemented method 800 of managing changes after moving a transform point associated with a rotated object. The exemplary method involves receiving input moving a rotated object, as shown in block 810. For example, this may involve receiving, in an electronic content creation application provided on a computer device such as the creation application 23 of device 10, input for an object of electronic content being edited. FIG. 9 illustrates an exemplary movement of a transform point associated with a rotated object in the electronic content of FIG. 7. In FIG. 9, the content creator has moved the transform point 306 in "STATE 1."

In the method 800 of FIG. 8, after receiving the input, the method 800 identifies any required changes, as shown in block 820. In the example of FIG. 9, the content creation application updates the transform point 306 in the other states based on the movement of the transform point 306 in "STATE 1" and identifies any other offsetting changes required. In particular, the (x,y) positions of the bounds 302 and its associated origin relative to the transform point 306 in "STATE 2," "STATE 3," and "STATE 4" are updated to reflect the change of the transform point 306. The individual positions of objects 303, 304, 305 are defined relative to the origin associated with bounds and thus are not changed.

In FIG. 8, the method 800 next identifies which changes, if any, will be hidden as shown in block 830, and selectively displays information about effects, as shown in block 840. With respect to the example of FIG. 9, the content creation application continues to display the information about the movement effect that was defined for the movement of the object 303 between "STATE 1" and "STATE 2," the information about the rotation effect that was defined by the rotation of the group of objects defined by bounds 302 in "STATE 3," and additionally displays information for the movement effect that was defined for the movement of object 305 in "STATE 4." However, the other changes identified for purposes of maintaining positioning are hidden and thus not displayed as effects.

While certain of the examples provided herein have been described with respect to the use of a transform point to apply rotation to one or more objects, it is noted that other changes and effects can be applied relative to a transform point. Such effects include, but are not limited to, rotate, scale, shear, movement, and any other matrix-based effect.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   displaying, by a processor, a group of related objects, wherein a respective visual appearance of each object from the group of related objects is modifiable by changing a respective state of the object;
   receiving, by the processor, input to a first object of the group of related objects, wherein the input specifies a change to a state of the first object, wherein the change to the state of the first object comprises a movement of the first object;
   determining, by the processor, that changing the state of the first object causes an indirect change to a state of a second object of the group of objects, wherein the changed state of the second object comprises a movement of the second object corresponding to the movement of the first object, wherein the indirect change includes at least one hidden effect;
   identifying, by the processor, a first visual indicator depicting the change to the state of the first object; and
   displaying the first visual indicator based on receiving the input that specifies the change to the state of the first object, wherein the first visual indicator is displayed without displaying a second visual indicator based on the state of the second object being indirectly changed by the change to the state of the first object, wherein the second visual indicator is displayed when input directly changing the state of the second object is received to depict direct changes to the state of the second object.

2. The method of claim 1, wherein the first visual indicator and the second visual indicator respectively comprise a first listing of effects applied to the first object to change the state of the first object and a second listing of effects applied to the second object to change the state of the second object.

3. The method of claim 1, wherein the first visual indicator comprises a first set of simultaneous displays of the first object before and after the change to the state of the first object and the second visual indicator comprises a second set of simultaneous displays of the second object before and after the change to the state of the second object.

4. The method of claim 1, wherein the first visual indicator comprises a first preview of the first object after the change to the state of the first object and the second visual indicator comprises a second preview of the second object after the change to the state of the second object.

5. The method of claim 1, wherein the first visual indicator and the second visual indicator respectively comprise a first animation of the first object and a second animation of the second object.

6. The method of claim 1,
   wherein the change to the state of the first object comprises a movement of the first object to a different position in a graphical interface;
   wherein the state of the second object being changed by the change to the state of the first object comprises a movement of the second object maintaining a relative position of the second object with respect to the first object.

7. The method of claim 1, wherein
   wherein the change to the state of the first object comprises a movement of a transform point from which the first object is offset;
   wherein the state of the second object being changed by the change to the state of the first object comprises a movement of the second object for maintaining a relative position of the second object with respect to the first object.

8. The method of claim 1,
   wherein the change to the state of the first object comprises a rotation of the first object;
   wherein the state of the second object being changed by the change to the state of the first object comprises a rotation of the second object.

9. A non-transitory computer-readable medium having program code encoded thereon, the program code comprising:
   program code for displaying a group of related objects, wherein a respective visual appearance of each object from the group of related objects is modifiable by changing a respective state of the object;
   program code for receiving input to a first object of the group of related objects, wherein the input specifies a change to a state of the first object, wherein the change to the state of the first object comprises a movement of the first object;
   program code for determining that changing the state of the first object causes an indirect change to a state of a second object of the group of objects, wherein the changed state of the second object comprises a movement of the second object corresponding to the movement of the first object, wherein the indirect change includes at least one hidden effect;
   program code for identifying a first visual indicator depicting the change to the state of the first object; and
   program code for displaying the first visual indicator based on receiving the input that specifies the change to the state of the first object, wherein the first visual indicator is displayed without displaying a second visual indicator based on the state of the second object being indirectly changed by the change to the state of the first object, wherein the second visual indicator is displayed when input directly changing the state of the second object is received to depict direct changes to the state of the second object.

10. The non-transitory computer-readable medium of claim 9, wherein the first visual indicator and the second visual indicator respectively comprise a first listing of effects applied to the first object to change the state of the first object and a second listing of effects applied to the second object to change the state of the second object.

11. The non-transitory computer-readable medium of claim 9, wherein the first visual indicator comprises a first set of simultaneous displays of the first object before and after the change to the state of the first object and the second visual indicator comprises a second set of simultaneous displays of the second object before and after the change to the state of the second object.

12. The non-transitory computer-readable medium of claim 9, wherein the first visual indicator comprises a first preview of the first object after the change to the state of the first object and the second visual indicator comprises a second preview of the second object after the change to the state of the second object.

13. The non-transitory computer-readable medium of claim 9, wherein the first visual indicator and the second visual indicator respectively comprise a first animation of the first object and a second animation of the second object.

14. The non-transitory computer-readable medium of claim 9,
wherein the change to the state of the first object comprises a movement of the first object to a different position in a graphical interface;
wherein the state of the second object being changed by the change to the state of the first object comprises a movement of the second object maintaining a relative position of the second object with respect to the first object.

15. The non-transitory computer-readable medium of claim 9, wherein
wherein the change to the state of the first object comprises a movement of a transform point from which the first object is offset;
wherein the state of the second object being changed by the change to the state of the first object comprises a movement of the second object for maintaining a relative position of the second object with respect to the first object.

16. The non-transitory computer-readable medium of claim 9,
wherein the change to the state of the first object comprises a rotation of the first object;
wherein the state of the second object being changed by the change to the state of the first object comprises a rotation of the second object.

17. A system comprising
a processor; and
a non-transitory computer-readable medium communicatively coupled to the processor,
wherein the processor is configured for executing instructions stored in the non-transitory computer-readable medium to perform operations comprising:
displaying a group of related objects, wherein a respective visual appearance of each object from the group of related objects is modifiable by changing a respective state of the object,
receiving input to a first object of the group of related objects, wherein the input specifies a change to a state of the first object, wherein the change to the state of the first object comprises a movement of the first object,
determining that changing the state of the first object causes an indirect change to a state of a second object of the group of objects, wherein the changed state of the second object comprises a movement of the second object corresponding to the movement of the first object, wherein the indirect change includes at least one hidden effect,
identifying a first visual indicator depicting the change to the state of the first object, and
displaying the first visual indicator based on receiving the input that specifies the change to the state of the first object, wherein the first visual indicator is displayed without displaying a second visual indicator based on the state of the second object being indirectly changed by the change to the state of the first object, wherein the second visual indicator is displayed when input directly changing the state of the second object is received to depict direct changes to the state of the second object.

18. The system of claim 17, wherein the first visual indicator and the second visual indicator respectively comprise a first listing of effects applied to the first object to change the state of the first object and a second listing of effects applied to the second object to change the state of the second object.

19. The system of claim 17, wherein the first visual indicator comprises a first set of simultaneous displays of the first object before and after the change to the state of the first object and the second visual indicator comprises a second set of simultaneous displays of the second object before and after the change to the state of the second object.

20. The system of claim 17, wherein the first visual indicator comprises a first preview of the first object after the change to the state of the first object and the second visual indicator comprises a second preview of the second object after the change to the state of the second object.

* * * * *